(12) United States Patent
Butte et al.

(10) Patent No.: US 6,456,824 B1
(45) Date of Patent: Sep. 24, 2002

(54) SATELLITE COMMUNICATION SYSTEM USING RF POWER SHARING FOR MULTIPLE FEEDS OR BEAMS IN DOWNLINKS

(75) Inventors: Eric G Butte, Cupertino; Randall D Tyner, Mountain View, both of CA (US)

(73) Assignee: Space Systems/Loral, Inc., Palo Alto, CA (US)

(*) Notice: Subject to any disclaimer, the term of this patent is extended or adjusted under 35 U.S.C. 154(b) by 0 days.

(21) Appl. No.: 09/152,331

(22) Filed: Sep. 14, 1998

(51) Int. Cl.$^7$ .............................. H04B 7/185; H04B 7/14
(52) U.S. Cl. .................. 455/12.1; 455/13.3; 455/427; 455/20; 455/25; 455/103; 455/234.2; 370/316
(58) Field of Search ..................... 455/12.1, 13.1, 455/13.3, 19, 20, 25, 102, 103, 129, 427, 430, 23, 234.2; 330/124 R; 370/281, 320, 319, 316, 335, 323

(56) References Cited

U.S. PATENT DOCUMENTS

| | | | | |
|---|---|---|---|---|
| 4,232,266 A | * | 11/1980 | Acampora | 455/13.3 |
| 4,425,639 A | * | 1/1984 | Acampora et al. | 455/25 X |
| 4,752,925 A | | 6/1988 | Thompson et al. | 370/307 |
| 4,819,227 A | | 4/1989 | Rosen | 370/75 |
| 4,931,802 A | | 6/1990 | Assal et al. | 342/356 |
| 5,287,543 A | * | 2/1994 | Wolkstein | 455/20 |
| 5,497,169 A | | 3/1996 | Wu | 343/909 |
| 5,576,721 A | | 11/1996 | Hwang et al. | 343/753 |
| 5,619,525 A | | 4/1997 | Wiedeman et al. | 375/200 |
| 5,649,310 A | | 7/1997 | Tyner et al. | 455/129 |
| 5,668,556 A | | 9/1997 | Rouffet et al. | 342/354 |
| 5,687,195 A | * | 11/1997 | Hwang et al. | 455/234.2 |
| 5,751,254 A | | 5/1998 | Bird et al. | 343/761 |
| 5,790,070 A | | 8/1998 | Natarajan et al. | 342/354 |
| 5,815,527 A | * | 9/1998 | Erving et al. | 370/206 |
| 5,848,060 A | * | 12/1998 | Dent | 455/12.1 X |
| 5,861,855 A | | 1/1999 | Arsenault et al. | 343/704 |
| 5,940,737 A | | 8/1999 | Eastman | 455/3.2 |
| 5,987,037 A | * | 11/1999 | Gans | 455/103 X |
| 5,995,495 A | * | 11/1999 | Sampson | 370/316 |
| 6,029,044 A | | 2/2000 | Arsenault et al. | 455/3.2 |
| 6,032,041 A | * | 2/2000 | Wainfan et al. | 455/427 |

OTHER PUBLICATIONS

"The Thermal Control System Of the German Direct Transmitting Communication Satellite TV–SAT", Kreeb, Helmut et al., AIAA, Conf. 8, 1980, 8 pages.

Flight Hardware Test Results Obtained On High Power Equipment And On The Repeater Subsystem Of A 12GHz D8S, W. Liebisch et al., AIAA, 1986, pp. 266–274.

* cited by examiner

*Primary Examiner*—Tracy Legree
(74) *Attorney, Agent, or Firm*—Perman & Green, LLP

(57) ABSTRACT

A satellite communication system includes at least one spacecraft in geosynchronous orbit for providing a plurality of beams on the surface of the earth, and a plurality of ground stations individual ones of which are located in one of the beams for transmitting uplink signals to the spacecraft. The spacecraft has a plurality of receivers for receiving a plurality of the uplinked signals from ground stations, a frequency translator for translating the received uplink signals to a transmission frequency of a plurality of downlink signals, and a plurality of transmitters for transmitting the plurality of downlink signals within the same beams as the corresponding uplink signals. Each transmitter includes a combiner for combining together a plurality of frequency translated signals and a power amplifier, such as a TWTA, for amplifying the combined plurality of frequency translated signals. An analysis is performed of how many transponder channels can be combined and power amplified in a single TWTA, or multiple paralleled TWTAs, and a determination is then made as to which feeds and/or beams have low data traffic and low required downlink power that makes then suitable candidates for combining their feeds and/or beams into a linearly driven TWTA(s). A reverse output multiplexer is used to separate the combined feeds and/or beams to the separate individual downlinks after the RF power amplification.

20 Claims, 8 Drawing Sheets

SAT #1

SAT #2

SATELLITE COMMUNICATION SYSTEM USING RF POWER SHARING FOR MULTIPLE FEEDS OR BEAMS IN DOWNLINKS

FIELD OF THE INVENTION

This invention relates generally to spacecraft communication systems and, in particular, to spacecraft communication systems t hat have at least one spacecraft that receives uplink signals from a number of ground station transmitters located within beams, and that frequency shifts and retransmits the received uplink signals to receivers located within the same beams.

BACKGROUND OF THE INVENTION

The use of a geosynchronous orbit satellite to broadcast television signals to terrestrial receivers is well known in the art. By example, reference can be had to the following two publications: "Flight Hardware Test Results Obtained o n High Power Equipment and on the Repeater Subsystem of 12 GHz DBS", W. Liebisch et al., 86–0646 AIAA, pp. 266–274, 1986; and "The Thermal Control System of the German Direct Transmitting Communication Satellite TV-SAT", Kreeb et al., AIAA 8th Communications Satellite Systems Conference, Apr. 20–24, 1980.

A number of problems are presented in the design of a high performance satellite communications system that provides, for example, television service to terrestrial receivers spread over a large geographical area. In such a system a number of different ground stations, each associated with a different locale and demographic market, may each transmit an uplink signal that is intended to be received by a spacecraft, such as a geosynchronous orbit satellite, and then transmitted, through one or more transponder channels, from the spacecraft to television receivers within the locale served by the ground station. For example, one ground station may serve the New York City area, another may serve the St. Louis area, while another serves the Salt Lake City area. Each ground station can provide one or more television channels, and is considered to be located within a particular spacecraft beam. More than one ground station can be serviced by a particular beam.

As can be appreciated, in such a system the size and hence downlink power requirements of each service area may differ significantly. That is, for a predetermined amount of RF power at the ground, more spacecraft transmitter power is required for a large beam than for a small beam. Furthermore, and in order to maximize the total number of ground stations that can be serviced, the spacecraft will require a significant number of uplink receivers, as well as a significant number of downlink power amplifiers, typically implemented as Travelling Wave Tube Amplifiers (TWTAs). In addition, it is important to provide some capability to control the transmission power so as to compensate for localized signal impairments, typically rain attenuation, that may be experienced at any given time in one locale but not in others.

It is known to provide gain and RF power control of transponder channels on one downlink beam with one ground station, but not with gain and RF power control of different transponder channels with multiple ground stations in a downlink beam.

In accordance with the prior art, and referring to FIG. 1A, a spacecraft communication system may have a spacecraft 1 that uses separate TWTAs 2 that each receive a separate signal from ground stations (GSs) located within the same or different beams. By example, a first beam (beam #1) may include four ground stations (GS1–GS4) while a second beam (beam #2) may include six different ground stations (GS1–GS6). Each ground station signal is passed through a separate spacecraft transponder channel, which includes a channel amplifier circuit, shown generally as an amplifier 4, and a TWTA 2. Each channel amplifier circuit 4 may be separately gain and/or RF power controlled by the associated ground station. The outputs of the TWTAs 2 for each beam are combined in an output multiplexer (OMUX) 3 prior to transmission on the downlink to the terrestrial receivers in each regional or spot beam.

It can be realized that this conventional approach can be wasteful of power and TWTAs, as each transponder channel will typically have differing RF power requirements. If it were desired to use only one type of TWTA (e.g., a 60 W TWTA) or only two types (e.g., 60 W and 120 W), then a transponder channel that requires only 10 W of RF power will use its TWTA much less efficiently than another transponder channel that requires 50 W of RF power.

Further in accordance with the prior art a single size spot beam may be provided that is contiguous across the continental United States (CONUS). Alternatively, and as is exemplified by U.S. Pat. No. 4,819,227, "Satellite Communications System Employing Frequency Reuse" to H. A. Rosen, a two-way satellite communication system can use spot beams in contiguous zones. In general, the prior art requires either more satellites or larger spot beam spacing, using a single size of spot beams, to obtain a required performance. The prior art may as well use more antennas interlaced over the CONUS area, with larger feed spacings and thus require more area on the satellite.

It is also known from the prior art to provide as many receivers as the total number of transponder channels, or as many as the number of feeds/beams, and to have each receiver translate its associated transponder channel or feed/beam to the appropriate downlink channel frequencies. Referring to FIG. 1C, the prior art teaches a system that uses either a single receiver 7 for one transponder or a single receiver 7 for one feed or one beam. As was also the case for FIG. 1A, each GS signal may originate from a separate geographical area (e.g., from ground stations located in different urban areas).

As can be appreciated, and as was also the case for FIG. 1A, the prior art approaches are not efficient with regard to spacecraft power consumption, weight, and/or payload utilization.

OBJECTS AND ADVANTAGES OF THE INVENTION

It is a first object and advantage of this invention to provide an improved satellite communications system wherein a plurality of satellite transponder channels are selected so as to combined and amplified by a single linearly driven high power amplifier, such as one TWTA or multiple paralleled TWTAs.

It is another object and advantage of this invention to provide a technique for summing a plurality of uplink satellite transponder channels into a linearly driven single TWTA or multiple paralleled TWTAs, or some other type of high power RF amplifier, and to then separate the amplified transponder channels into a plurality of distinct downlink feeds and/or spot or regional beams.

SUMMARY OF THE INVENTION

Certain of the foregoing and other problems are overcome and the objects and advantages are realized by methods and apparatus in accordance with embodiments of this invention.

In accordance with this invention there is provided a satellite communication RF power control system to deliver digital data, such as digital television data, from multiple ground stations to feeds and/or spot or regional beams.

The teachings of this invention relate to a satellite communication RF power sharing system to deliver digital data from multiple spot or regional beams via a combination of input combiners and output splitters, and by amplifying a plurality of signal/transponder channels with one high power amplifier (HPA), such as one or more TWTAs or solid-state power amplifiers. For spot or regional beams with low data traffic and low required RF downlink power, this aspect of the invention can combine multiple feeds and/or beams to one HPA or TWTA, and can then use a reverse output multiplexer (OMUX) to split the output of the HPA or TWTA to the designated feeds and/or beams. In the context of this invention one or more feeds can be form one beam.

A previous known solution would employ many HPAs or TWTAs with different power levels to deliver downlink power for each spot or regional beam. This conventional approach would thus require a large set of low power and high power HPAs or TWTAs on the satellite, whereas the teaching of this invention enables a reduction in and/or an elimination of the low power HPAs or TWTAs, which typically exhibit lower efficiency. That is, by combining a plurality of transponder channels that would conventionally require a plurality of low power TWTAs (or some other type of RF power amplifier) into one higher power TWTA, and then separating the amplified transponder channels, a number of the low power TWTAs can be completely eliminated from the spacecraft, thereby conserving payload weight, volume and power consumption.

This aspect of the invention employs an analysis of how many transponder channels can be combined and power amplified in a single HPA or TWTA, or multiple paralleled TWTAs, and determines which feeds and/or beams have low data traffic and low required downlink power that makes then suitable candidates for combining their feeds and/or beams into a linearly driven HPA or TWTA, or multiple paralleled TWTA power amplifier. The reverse OMUX 46 is used to separate the combined feeds and/or beams to the separate individual downlinks after the power amplification of the HPA or TWTA, or multiple paralleled TWTAs.

This invention thus provides a satellite communication system that includes at least one spacecraft in geosynchronous orbit that provides a plurality of beams on the surface of the earth, and a plurality of ground stations individual ones of which are located in one of the beams for transmitting uplink signals to one of the spacecraft. The spacecraft has a plurality of receivers for receiving a plurality of the uplinked signals from ground stations, a frequency translator for translating the received uplink signals to a transmission frequency of a plurality of downlink signals, and a plurality of transmitters for transmitting the plurality of downlink signals within the same beams as the corresponding uplink signals. Each transmitter includes a combiner for combining together a plurality of frequency translated signals and a power amplifier, such as a TWTA, for amplifying the combined plurality of frequency translated signals. The spacecraft further includes an output splitter for separating the amplified combined plurality of frequency translated signals into a plurality of downlink signals in a plurality of feeds and/or beams.

Individual ones of the plurality of frequency translated signals are selected such that a sum of a maximum downlink RF power will not exceed the power handling capability and linearity of a single TWTA or multiple paralleled TWTAs.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 2A:
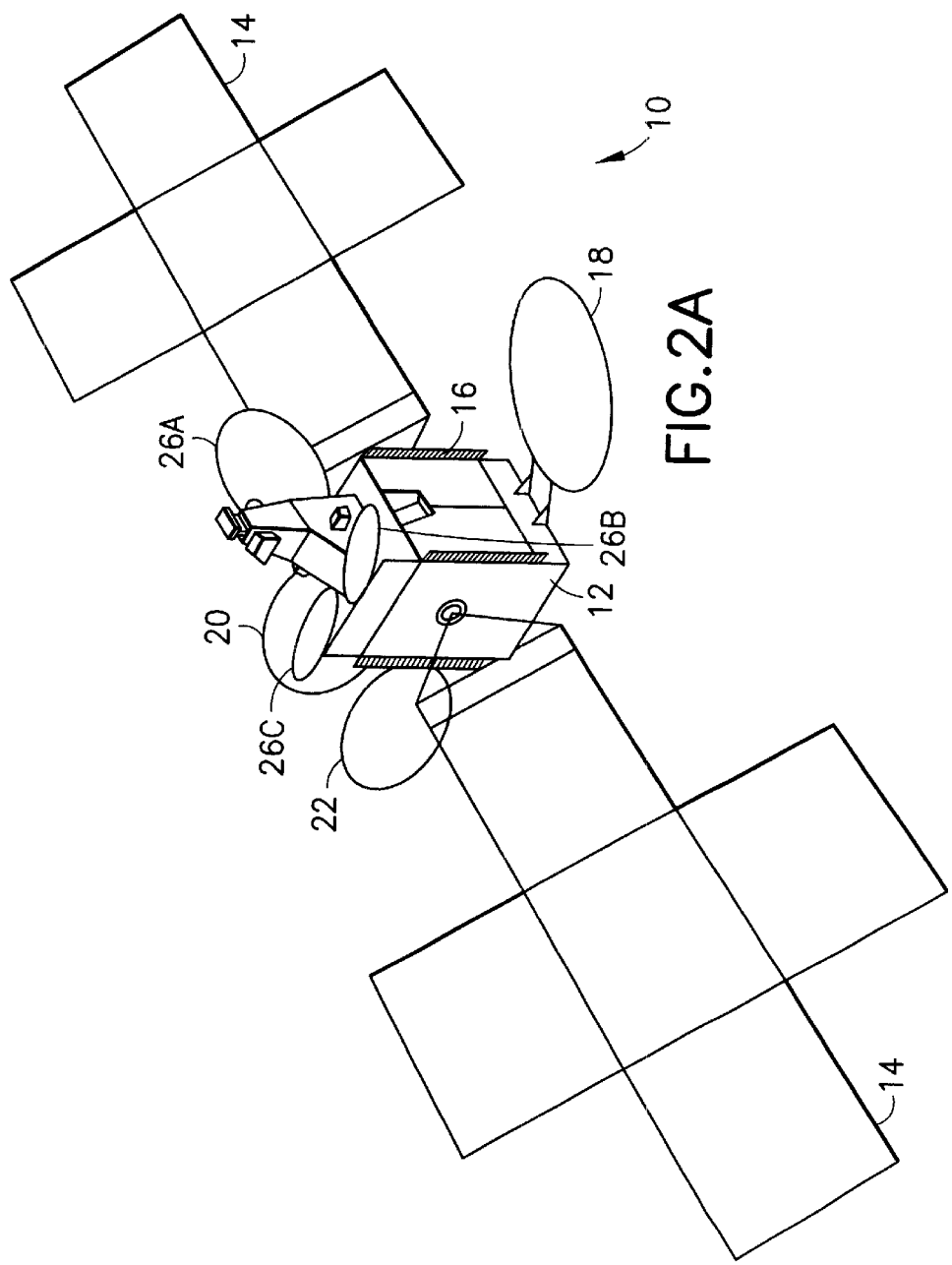
FIG. 2A is an elevational view of a communications spacecraft that is suitable for practicing this invention.
Figure 2B:
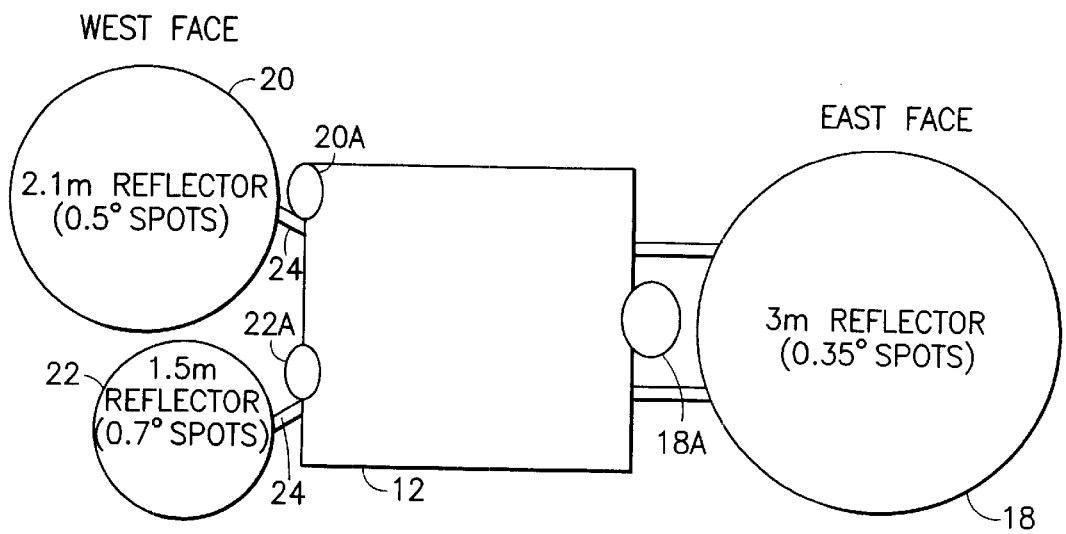
FIG. 2B depicts a portion of the spacecraft of FIG. 2A, and shows in greater detail three antenna reflectors for generating different size spot beams.

Reference is made to FIGS. 2A and 2B for illustrating a geosynchronous orbit satellite or spacecraft 10 that is suitable for practicing this invention. In the ensuing description it will be assumed that two such spacecraft are employed together for providing direct spacecraft digital television coverage to localized regions of the continental United States (see also FIGS. 4A and 4B), as well as to Hawaii and Alaska. It should, however, be realized at the outset that the teachings of this invention are not limited to providing only television signals, but can be used to provide any type of digital data, including but not limited to digitized voice, facsimile, paging, and computer network data, including Internet data packets. The teaching of this invention is also not limited to the use of two spacecraft, as more or less than this number can be used, nor is the teaching limited to, by example, only the specific frequencies and/or numbers, sizes or shapes of beams that will be described below.

In FIGS. 2A and 2B the spacecraft 10 includes a bus 12 and solar cell arrays 14. Mounted to the bus 12 are a plurality of direct radiating TWTAs 16, such as Ka band, or Ku band, or C band TWTAS. For a Ka band case three antennas are used per spacecraft to generate the spot beams: a 3 meter Gregorian antenna 18 TX/RCV antenna for generating a 0.35° spot beam, a 2.1 meter offset feed TX/RCV antenna 20 for generating a 0.5° spot beam, and a 1.5 meter offset feed TX/RCV antenna 22 for generating a 0.70° spot beam. Antenna pointing mechanisms 24 are provided, as is a steerable subreflector 18A that provides autotracking for the 3 meter antenna 18, as well as steerable subreflectors 20A and 22A for the antennas 20 and 22, respectively. Other antennas include two shaped Gregorian antennas 26A and 26B for high definition television (HDTV), as well as one shaped Gregorian antenna 26C for providing conditional access to a ground controller. The antennas 26A–26C are not germane to the teachings of this invention, and are not described further with any degree of specificity. Each antenna is preferably autotracked for providing very low pointing error.

Although described in the context of Gregorian antennas, the antennas could be implemented as well with Cassegrain antennas. In general, the use of Gregorian or Cassegrain antennas is preferred for providing large scan capability with high side lobe isolation. The ratio of focal length to diameter (F/D) is preferably in the range of about two to about three. Furthermore, and while illustrated as circular antennas, it can be appreciated that one or more of the antennas 18, 20 or 22 could have a non-circular shape, such as an elliptical shape, for providing non-circular shaped beams at the surface of the earth.

The Ka band 3 meter 0.35° antenna 18 is located on the east face of the spacecraft 10, and the subreflector 18A is used for this large antenna because it is much lighter and easier to steer than the main reflector. The subreflector 18A provides additional benefits. For example, the transmit and receive beams have the same boresight, whereas there is a small offset when simple offset reflectors are used. This is particularly important for this small beam.

Eleven beams are generated from the 3 meter antenna 18 for the LHCP spacecraft, whereas the 3 meter antenna on the RHCP spacecraft generates 12 beams. The antenna 18 is preferably boresighted in the southeast portion of CONUS to minimize scan losses in the high rain areas. The beam spacing enables the use of 2λ or larger feeds. This feed diameter reduces spillover loss and sidelobe levels.

The Ka band 2.1 m, 0.5° and 1.5 m, 0.7° antennas 20 and 22 are located side-by-side on the west face of the spacecraft 10. These antennas use two-axis gimbaled mechanisms for deployment. The subreflectors 20A and 22A are provided as described above.

The LHCP spacecraft has ten 0.5° beams; the RHCP spacecraft eleven. The Ka band 1.5 meter 0.7° antennas generates 9 CONUS beams and the Hawaii beam on the LHCP spacecraft. The RHCP spacecraft 0.7° antenna generates 8 CONUS beams. The Alaska beam may also be generated from this antenna using two feeds to create an elliptical pattern.

In one embodiment the system uses a 700 MHz frequency band at Ka-band with a 29.3–30 GHz uplink and a 19.5–20.2 GHz downlink. The frequency plan provides 46 26 MHz transponders, 23 on each polarization. The HDTV system uses 12 transponders, while the SDTV system uses 34. The spot beams are divided between the two spacecraft by polarization. Spacecraft 1 processes 149 transponders in 31 Left Hand Circular Polarization (LHCP) beams, while spacecraft 2 processes 145 transponders in 32 Right Hand Circular Polarization (RHCP) beams.

Figure 3A:
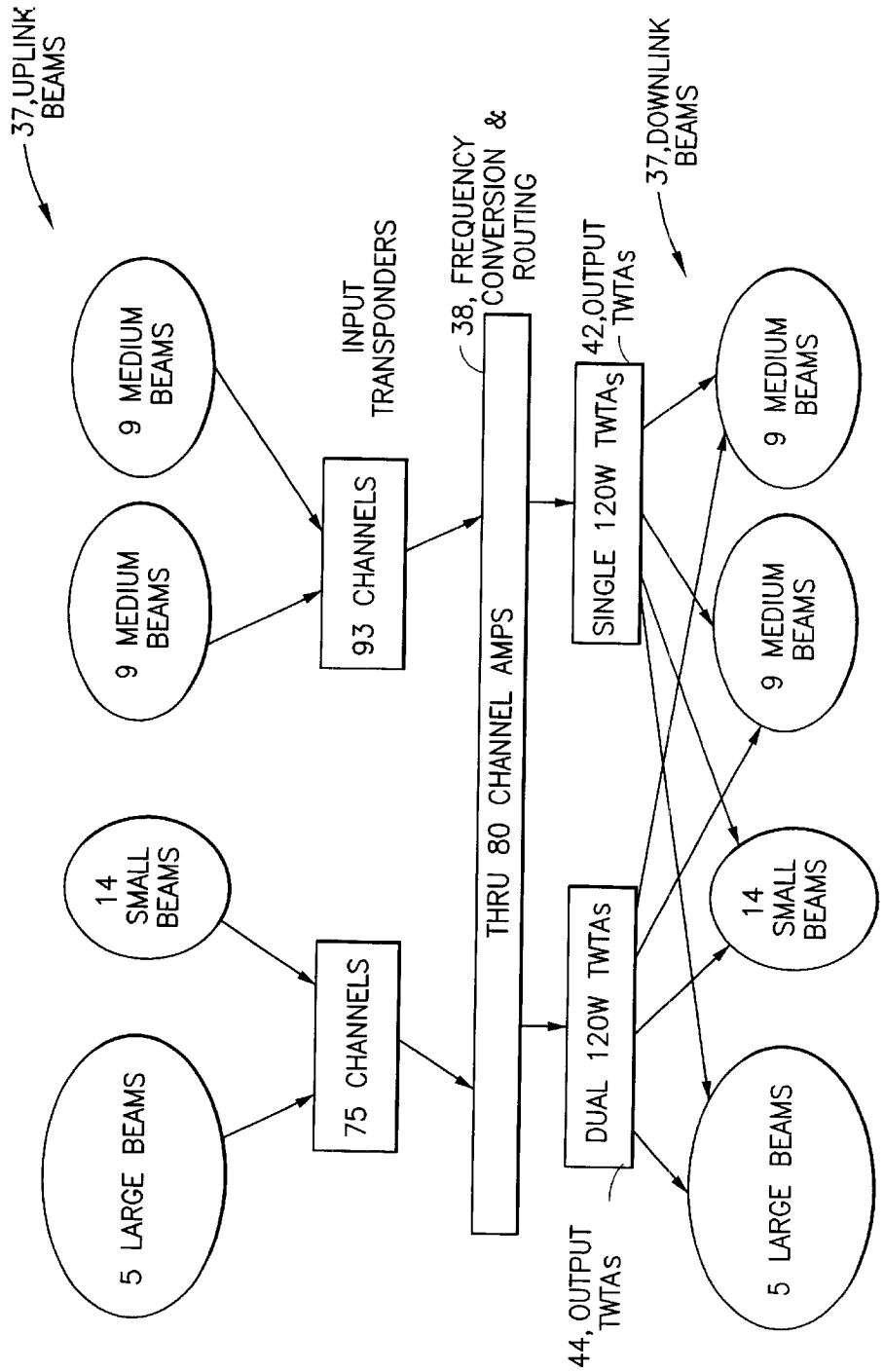
FIG. 3A is a diagram illustrating a generalized spacecraft payload for an exemplary 37 beam uplink and downlink case.
Figure 3B:
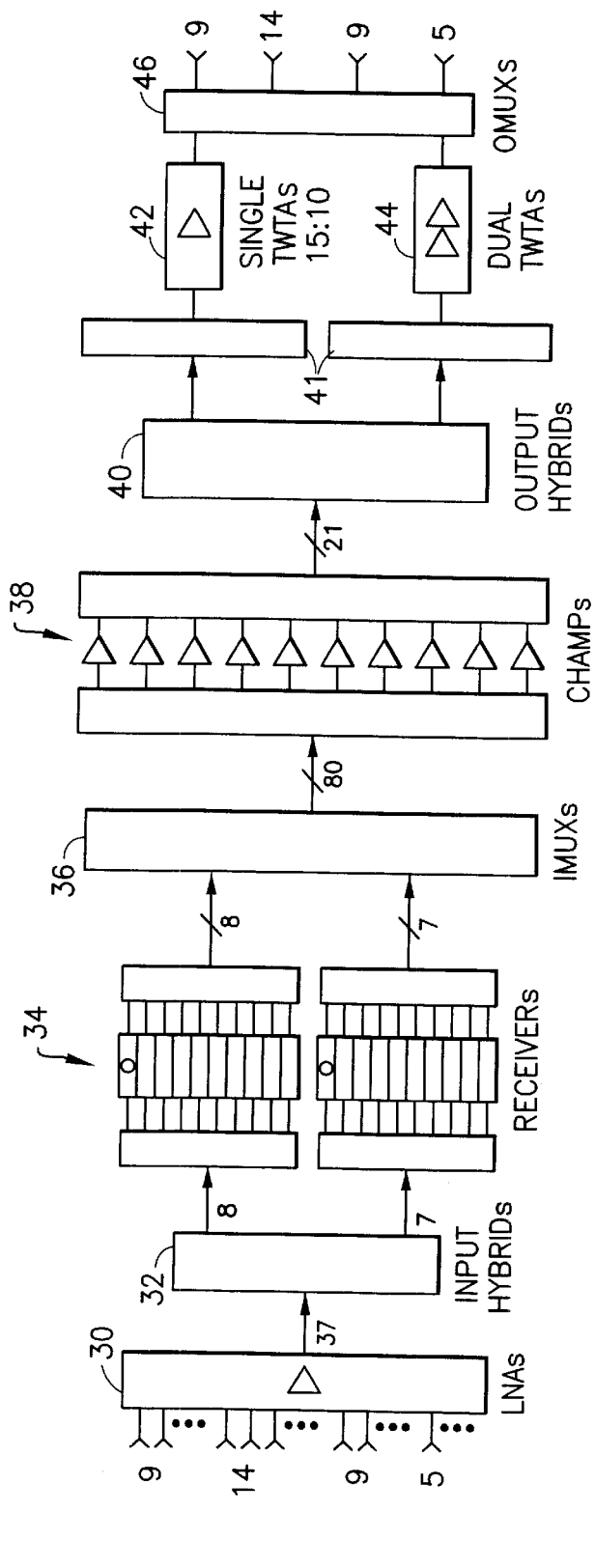
FIG. 3B is a circuit block diagram of the spacecraft payload for the exemplary 37 beam uplink and downlink case shown in FIG. 3A.

Referring to FIGS. 3A and 3B, the repeater is a single-conversion design. The 30 GHz uplinks (37 beams of different sizes) are amplified by low noise amplifiers (LNAs) 30 and applied though input hybrids 32 to receivers 34. The uplinks are amplified and down-converted by a 9.8 GHz local oscillator (LO) to the 20-GHZ downlink band. The signals from each beam are then separated in input multiplexers 36 and applied to channel amplifiers 38, and then to output hybrids 40. Each beam's transponders are amplified as a group in a high-power, linearized TWTA 42 operating at a 2.5 dB to 3 dB output backoff. In some cases where beams have only a few transponders and also require low power, signals from two beams are amplified in the same TWTA, then separated in an output multiplexer 46. Single and paralleled 120W TWTAs 42 and 46 are provided.

This design approach minimizes the payload mass and complexity. The input multiplexers enable the uplinks to be received using only 11 active receivers instead of 30 or 31 if individual receivers were used for each beam. By processing the signals from each beam as a group, much fewer filters and channel amplifiers are required. Use of one single size TWTA (e.g., 120W) permits the use of large redundancy rings to improve reliability. The TWTA is a direct-radiating collector (DRC) design, which radiates over half the thermal dissipation to space instead of into the spacecraft body, greatly simplifying the spacecraft thermal design.

Each channel amplifier 38 preferably provides a nominal 50 dB of gain. The output level is commandable in 0.5 dB steps over, for example, a 6 dB range so that the drive to the TWTAs 42, 44 can be set precisely.

Output linearizers 41 are preferably optimized for TWTA output backoffs from about 2 dB to 3 dB. The TWTAs use one EPC for two TWTAs. This yields excellent phase tracking when two TWTAs are operated in the combined high power mode. Reference in this regard can be had to commonly assigned U.S. Pat. No. 5,649,310, "Signal Translation and Amplification System Including a Thermal Radiation Panel Coupled Thereto", by Randall D. Tyner et al., the disclosure of which is incorporated by reference herein in its entirety.

Figure 3C:
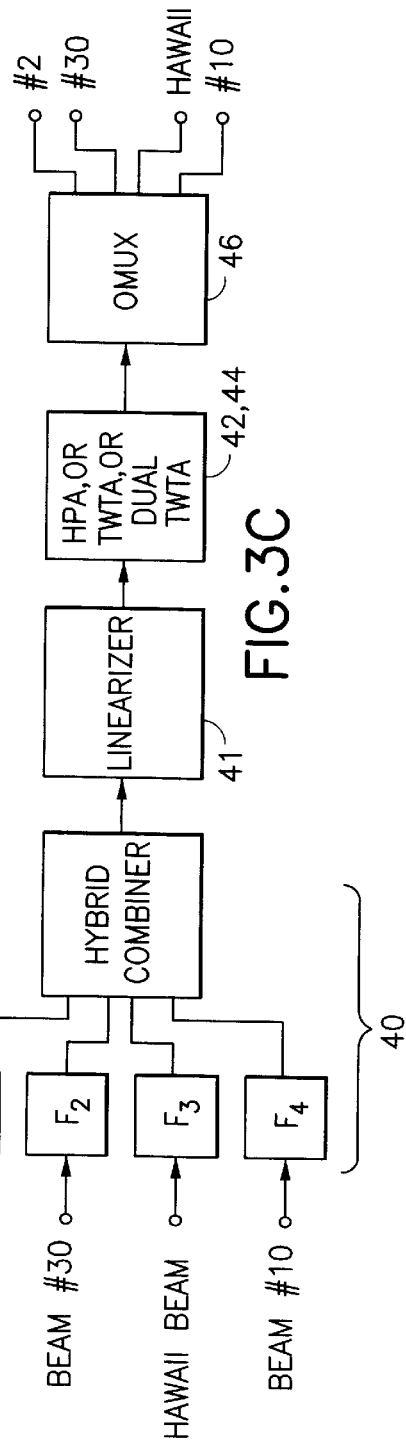
FIG. 3C is a simplified circuit block diagram of a portion of a further embodiment of a spacecraft payload in accordance with this invention.

Referring to FIG. 3C, a further embodiment of this invention is shown. This embodiment relates to a satellite communication RF power sharing system for delivering digital data from multiple spot or regional beams via a combination of input combiners 40 and output splitters 46, and by amplifying a plurality of signal/transponder channels with one high power amplifier (HPA), such as TWTAs 42, 44 or solid-state power amplifiers. For spot or regional beams with low data traffic and low required RF downlink power, this aspect of the invention can combine multiple feeds and/or beams to one HPA or TWTA, and can then use a reverse OMUX to split the output of the HPA or TWTA to the designated feeds and/or beams. The plurality of frequency translated signals corresponding to received uplink signals are thus selected for combination such that a sum of a maximum RF power for the constituent downlink signals will not exceed the power handling capability and linearity of the single TWTA or multiple paralleled TWTAs. Of course, two uplink signals having the same frequency would not be selected for combining, amplification and subsequent splitting. In FIG. 3C, the exemplary four input/four output RF stage would process spot beam #2, beam #30, a regional (e.g., Hawaii) beam, and a beam #10. This embodiment is in contrast to the earlier described embodiments, wherein signals from multiple groundstations within a single beam are combined and amplified.

A previously known solution to this problem would employ many HPAs or TWTAs with different power levels to deliver downlink power for each spot or regional beam. This conventional approach would thus require a large set of low power and high power HPAs or TWTAs on the satellite, whereas the teaching of this invention enables a reduction in and/or an elimination of the low power HPAs or TWTAs, which typically exhibit lower efficiency. That is, by combining a plurality of transponder channels that would conventionally require a plurality of low power TWTAs (or some other type of RF power amplifier) into one higher power TWTA, and then separating the amplified transponder channels, a number of the low power TWTAs can be completely eliminated from the spacecraft, thereby conserving payload weight, volume and power consumption.

This aspect of the invention relies on an analysis of how many transponder channels can be combined and power amplified in a single HPA or TWTA, or multiple paralleled TWTAs, and determines which feeds and/or beams have low data traffic and low required downlink power that makes then suitable candidates for combining their feeds and/or beams into a linearly driven HPA or TWTA, or multiple paralleled TWTA power amplifier. The reverse OMUX 46 is used to separate the combined feeds and/or beams to the separate individual downlinks after the power amplification of the HPA or TWTA, or multiple paralleled TWTAs.

In the satellite communications system of most interest to the teaching of this invention every regional beam will exhibit different data traffic and rain attenuation, resulting in different power levels being required for spot or regional beams. The prior art approach would require a multitude of different sized HPAs or TWTAs to accommodate different requirements for the spot or regional beams. This invention takes advantage of an analysis of power amplifying multiple transponder channels in a given linearly driven HPA and/or TWTA, and uses input filters (F1–F4) and a hybrid combiner 40 (see also FIG. 1E) and a reverse OMUX 46, to combine the low power feeds and/or beams into one linearly driven HPA or TWTA 42, or multiple paralleled TWTAs 44.

That is, this aspect of the invention takes a plurality of lower power downlink feeds and/or beams and sums them, using hybrid combiners with some filtering characteristics, into a linearized HPAs or a TWTA 42 or multiple paralleled TWTAs 44. The initial analysis determines how many transponder channels can exist in a given HPA or TWTA or multiple paralleled TWTAs, that is linearized with block 41 to insure adequate co-channel interference isolation requirements for the satellite communication system. After the power amplification is complete the reverse OMUX 46 is used to separate out the power amplified set of transponder channels to the separate feeds and/or beams which were originally summed together. The reverse OMUX 46 output is thus sent to the appropriate ones of the antennas associated with the downlink feeds and/or beams.

Figure 1A:
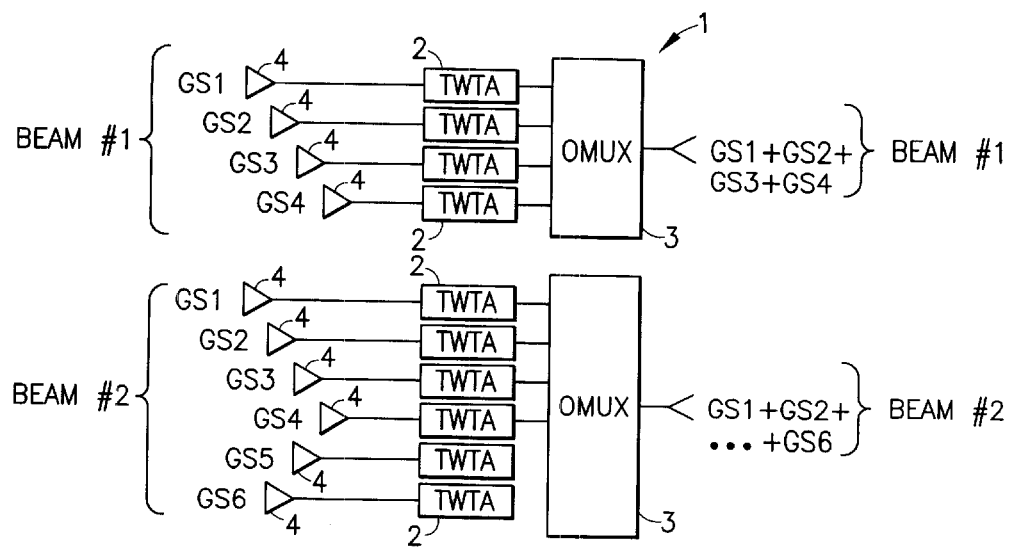
FIG. 1A is a simplified block diagram showing a portion of a conventional spacecraft communications payload, specifically the use of individual TWTAs for individual transponder channels.
Figure 1B:
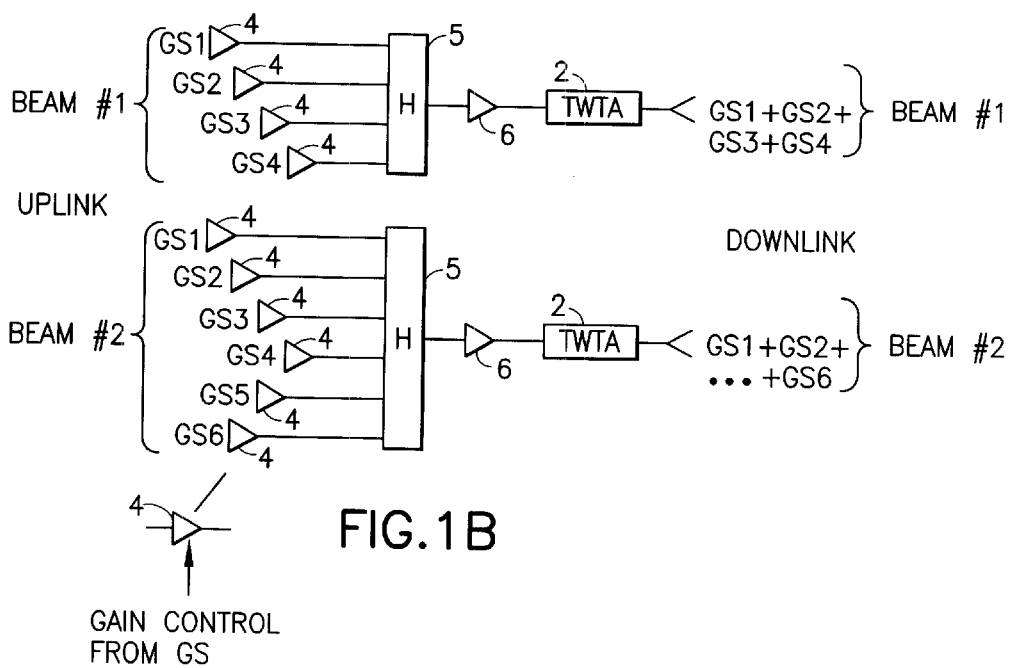
FIG. 1B is a simplified block diagram of a portion of a spacecraft communications payload in accordance with an aspect of this invention, wherein a plurality of transponder channels are combined and fed to a single TWTA.

In accordance with a further aspect of this invention, and referring to FIG. 1B, there is provided a satellite communication RF power control system to deliver digital data, such as digital television data, from multiple ground stations to a single spot or regional beam. Each ground station in the spot or regional beam has separate and individual control of the RF power for their transponder channel or channels. The RF power control for each individual ground station enables adjustment of downlink power due to rain attenuation within the spot or regional beam. That is, power adjustments are performed in a particular transponder channel prior to combination with other transponder channels and amplification by a single, common TWTA or multiple paralleled TWTAs. Power control commands can be sent to the spacecraft on a specific control channel reserved for that purpose using, for example, the shaped Gregorian antenna 26C that was shown in FIG. 2A.

In FIG. 1B the exemplary prior art configuration of FIG. 1A is modified to insert hybrid combiners 5 to combine the outputs of gain controlled channel amplifiers 4 for beam #1 and the gain controlled channel amplifiers 4 for beam #2. The combined outputs are then buffered and linearized with linearizer 6 before being applied to TWTAs 2. The ground stations assigned to each hybrid 5 and TWTA 2 are selected such that the worst case maximum power will not exceed the power that can be accommodated by the channelized spot beam. As but one example, for beam #1 the GSs1–4 may be at frequencies of 30.3, 30,2, 29.9 and 29.8 GHz, and the downconverted signals applied to the TWTA 2 may be at 20.3, 20.2, 19.9 and 19.8 GHz. The bandwidth of the TWTA may be at least 500 MHz.

The linearizer 6 can be conventional in construction, and is preferably selected to maximize the TWT Noise Power Ratio (NPR). As the NPR increases the TWTA linearity increases, and undesirable inter-modulation products decrease.

Each groundstation can monitor the resulting downlink beam and thereby compensate for signal impairments, such as rain fades. Being that the uplink is at a higher frequency than the downlink, the effect of rain will be more severe on the uplink than the downlink. However, each groundstation is enabled to separately gain control its own beam, prior to combining and power amplification, so as not to impact the power in the other beams also being amplified by the TWTA 2.

It can be noticed as well that the OMUXs 3 of FIG. 1A can be removed, thereby eliminating the DC power losses in these typically inefficient components.

The use of this aspect of the invention thus enables multiple ground stations with assigned transponder channels to have RF power and gain control in an assigned spot or regional beam, with minimal effects to neighboring ground station signal(s). In the inventive satellite communications system there is a sharing of the amount of gain and power control between the ground station and the spacecraft. For a given spot or regional beam there is determined a number of ground stations that can share a common TWTA, without exceeding the capability of the TWTA under worse case conditions, and then an assignment is made of separate channel amplifiers for each ground station. A summation of the channel amplifier outputs is applied to a common linearizer that drives a common TWTA or multiple paralleled TWTAS. This technique enables a single type and size of TWTA to be used on a given spacecraft, thereby lowering cost and complexity, as well as power consumption.

In this embodiment an analysis of multiple transponder channels in a nonlinear system is performed to determine the number of transponders that can be used for each of the multiple ground stations, each having their own spacecraft channel amplifiers, to drive a linearized TWTA or multiple paralleled TWTAs into one beam. This technique thus further eliminates output multiplexer losses which can directly impact the spacecraft's power and thermal efficiency.

An example of this invention is a method of distributing digital data, such as digital television data, using multiple spot beams with different shapes and sizes to fully cover and serve designated market areas (DMAs) using multiple spacecraft in a geosynchronous orbit. Each spot beam can contain multiple ground stations. Each ground station can be assigned multiple transponder channels and has the ability to adjust transponder channel power or gain. By assigning a channel amplifier for each ground station, multiple ground stations can share a TWTA or multiple paralleled TWTAs.

In a further aspect this invention teaches a spacecraft communication payload design to reduce the number of receivers and the dc power consumption of the payload system. This is done by using input multiplexers to sum signals arriving from multiple spot or regional beams, while being selective in this summing to avoid the use of the same transponder channels in the same input multiplexer. The summed output is then taken to a single receiver.

Figure 1C:
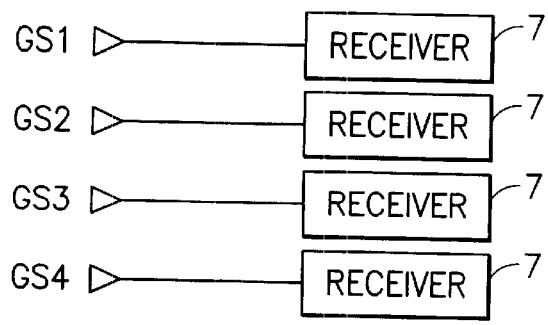
FIG. 1C is a simplified block diagram showing another portion of a conventional spacecraft communications payload, specifically the use of individual receivers for individual transponder channels.
Figure 1D:
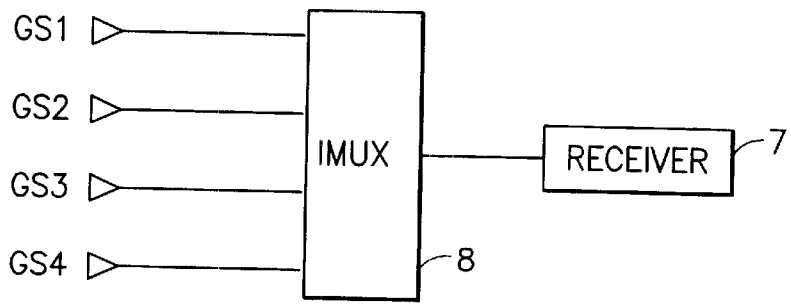
FIG. 1D is a simplified block diagram of the portion of a spacecraft communications payload in accordance with a further aspect of this invention, wherein a plurality of transponder channels are instead combined in an input multiplexer (IMUX) and fed to a single receiver.
Figure 1E:
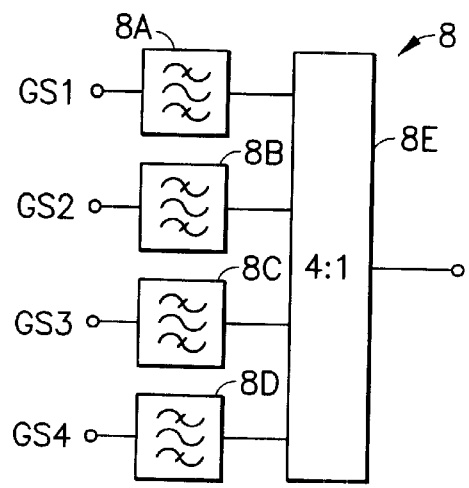
FIG. 1E illustrates the IMUX of FIG. 1D in greater detail for the exemplary 4:1 configuration.

Referring to FIG. 1D, the embodiment of FIG. 3B can be modified so as to provide a single receiver 7 that serves multiple uplinks, with an input multiplexer (IMUX) 8 being used to first combine the uplink signals. FIG. 1E illustrates the IMUX 8 of FIG. 1D in greater detail. It can be seen that each IMUX 8 is comprised of a plurality of n resonant filters, shown as four bandpass filters 8A–8D, whose output nodes are coupled to an n:1 hybrid combiner. The effect is to sum n narrower bandwidth, different frequency feeds into one wider bandwidth output signal. The characteristics of the bandpass filters 8A–8D are selected so as to achieve adjacent channel band rejection, and the hybrid 8E is selected so as to have a bandwidth sufficient to accommodate the bandwidth of the input feeds.

As but one example, for a Ka-band case a total spectrum of 500 MHz is partitioned into 27 MHz channels, each bandpass filter of the IMUX 8 is optimized to operate with one of the 27 MHz channels, and the receiver/downconverter 7 has a bandwidth of 500 MHz.

This aspect of the invention thus enables the use of the input multiplexers 8 that are considerably smaller and less expensive than the individual receivers of FIG. 1C. A single one of the input multiplexers 8 sums multiple beams and/or feeds into the single receiver 7, and thus significantly reduces the number of receivers required for a given payload architecture. The single receiver 7 is preferably designed to perform in the linear region to minimize co-channel interference and third order intermodulation products. The single receiver 7 is assumed for the purposes of this invention to include a low noise amplifier (LNA) that feeds a downconversion mixer circuit operating with a generated local oscillator signal. The receiver 7 is further assumed to have a bandwidth sufficient for accommodating the bandwidth requirements of the multiple combined inputs.

An example of the use of this invention is a unique method of distributing digital data using multiple spot beams with different shapes and sizes to fully cover and service the United States Nielsen designated market areas (DMAs) using multiple spacecraft in a geosynchronous orbit. Each spot beam has an assigned set of transponders, and allocated transponders of one or more spot beams can are then multiplexed and summed into the same single receiver 7. This communications payload system design significantly reduces the number of required receivers 7, compared to payload systems designed in accordance with the prior art.

Figure 4A:
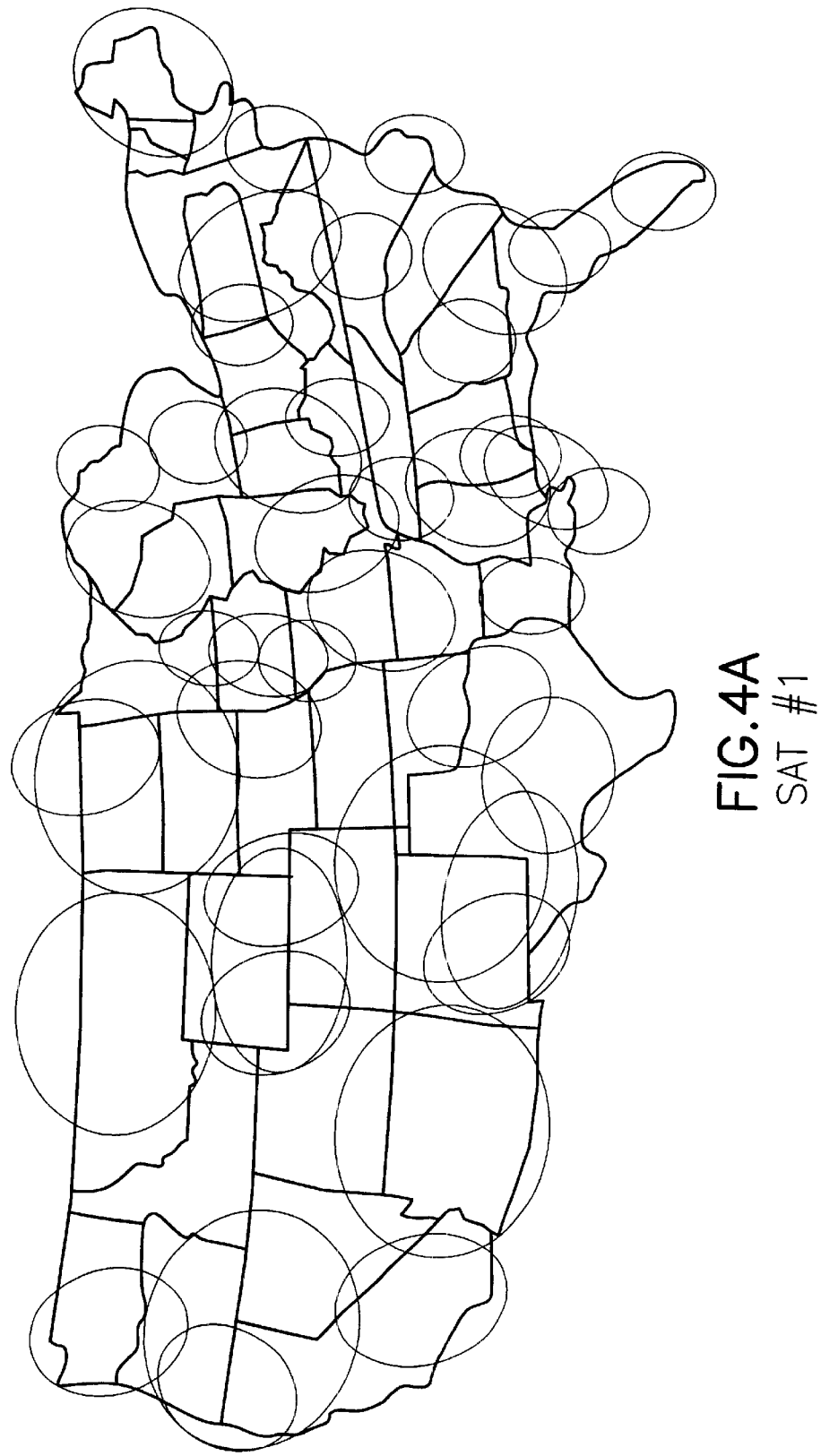
FIGS. 4A and 4B illustrate various exemplary spot beam sizes and shapes for a first communications spacecraft (FIG. 4A) and a second communications spacecraft (FIG. 4B) that cooperate, as in FIG. 2C, to provide direct spacecraft television coverage to the continental United States.
Figure 4B:
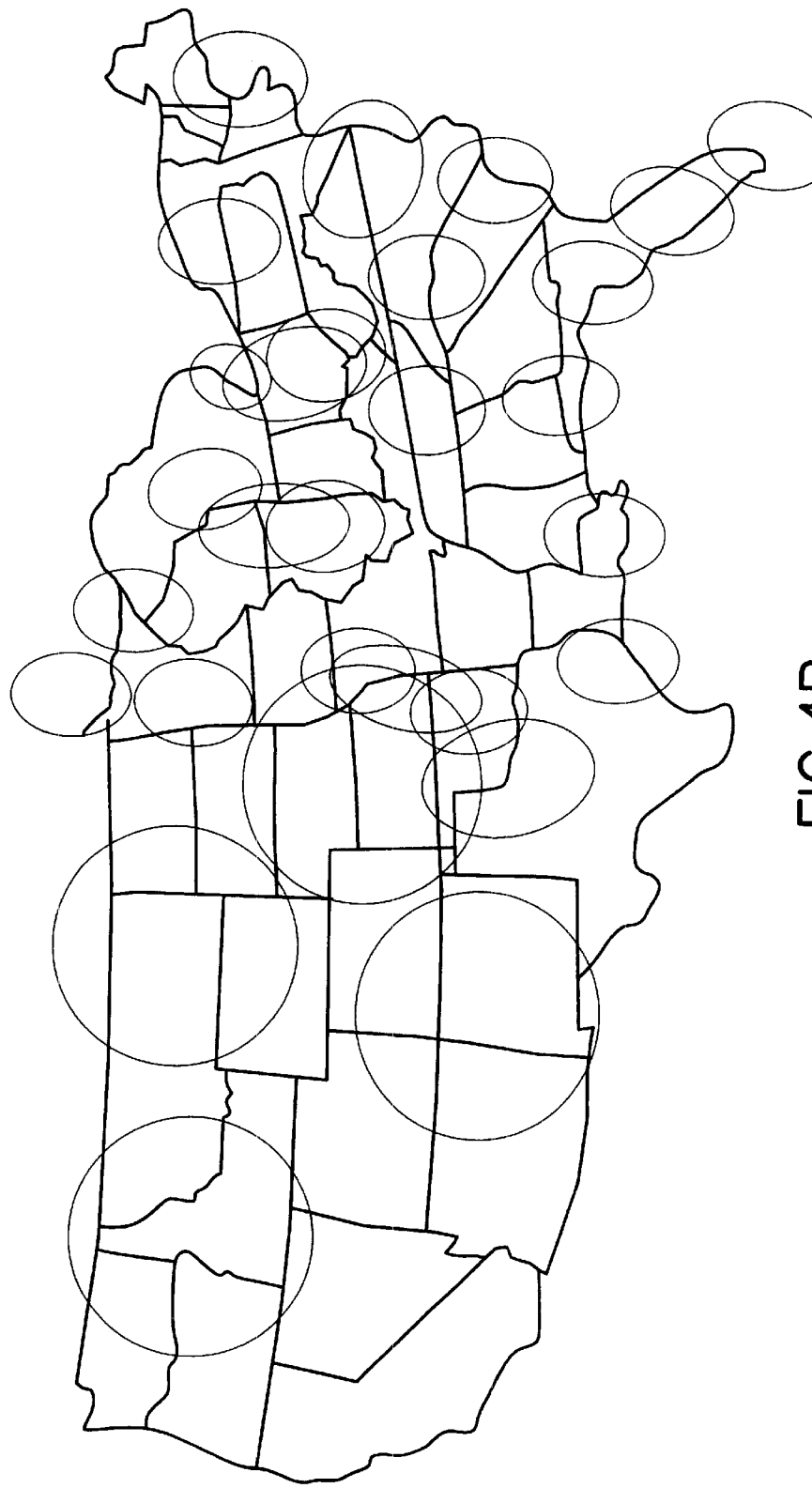

Referring now to FIGS. 4A and 4B, a further aspect of this invention is an ability to use the spacecraft communication system to deliver digital data from a ground station within a spot beam to the same spot beam, one way, via various antenna spot beam patterns. The patterns use a variation of different sized spot beams each having either a circular shape or a non-circular shape, such as an elliptical shape, or a combination of both shapes to cover an entire geographical area that is to be serviced. This type of service can thus accommodate differences in markets, demographics, languages, etc.

Figure 2C:
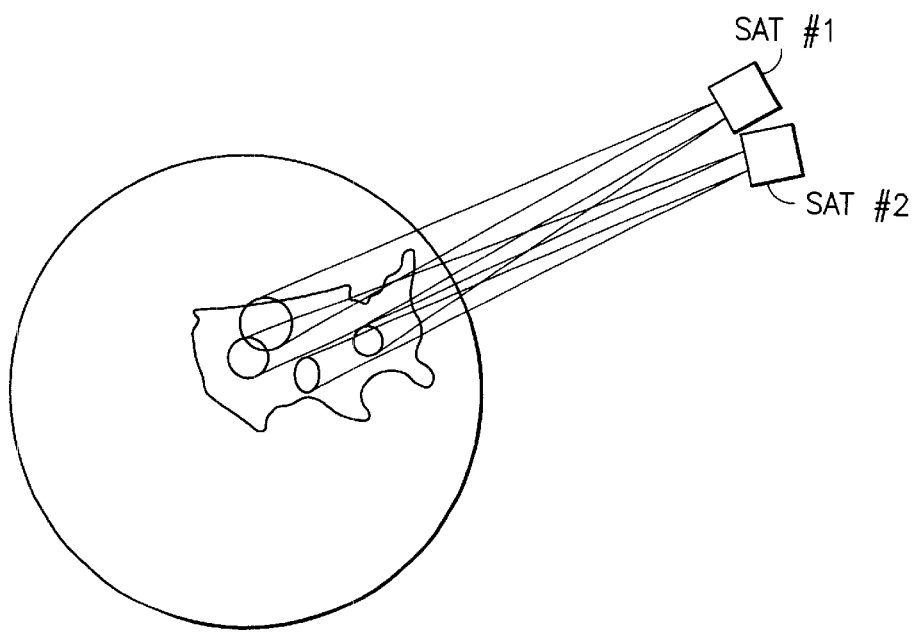
FIG. 2C depicts a two spacecraft communication system in accordance with an aspect of this invention.

A combination of non-circular and circular spot beams of different sizes is used to form a non-contiguous pattern or non-contiguous zones, thereby providing enhanced interbeam isolation. An example of the utility of this invention is an ability to provide coverage of all of the CONUS Nielsen DMAs with two spacecraft in a single or multiple geosynchronous orbits, as shown in FIG. 2C. This technique improves frequency reuse of a given bandwidth, with a minimum set of antennas and spacecraft, versus a conventional contiguous approach for the spot beam locations.

In the preferred embodiment shown in FIG. 2C there are two spacecraft in a single geosynchronous orbit location, e.g., within about 0.2°, that are used to cover all of the DMAs using alternate spot beam locations between the two spacecraft. Each spacecraft uplinks in a single polarity, but opposite from the other spacecraft.

More specifically, spacecraft #1 uplinks either RHCP or LHCP and spacecraft #2 uplinks either LHCP or RHCP (in an opposite polarity), or spacecraft #1 uplinks in a vertical linear polarization and spacecraft #2 uplinks in a horizontal linear polarization, or vice versa.

The downlink for each spacecraft is the opposite of its uplink polarity. For example, spacecraft #1 uplinks in RHCP and downlinks in LHCP, while spacecraft #2 uplinks in LHCP and downlinks in RHCP, or spacecraft #1 uplinks in vertical linear and downlinks in horizontal linear, while spacecraft #2 uplinks in horizontal linear and downlinks in vertical linear polarization.

The two spacecraft system design can either use all different size non-circular, such as elliptical, spot beams, all different size circular spot beams, or a combination of different size non-circular and circular spot beams to cover all of the DMAs. General techniques for forming different sized spot beams with reflector antennas of the type described above, as well as for forming either circular or non-circular spot beams, are known to those skilled in the art, but not the combination of different sized and shaped spot beams for covering various terrestrial regions, enabling improved frequency reuse and a reduction in interbeam interference, as described herein.

As but one example, the 3 meter circular antenna 18 could be instead an elliptical antenna having dimensions of 3.2 meters by 2.5 meters for forming elliptical as opposed to circular beams.

It should further be realized that the teaching of this invention is not limited for use with two spacecraft operating with different polarizations. For example, there could be three or more spacecraft each operating with dual polarization.

Thus, while the invention has been particularly shown and described with respect to preferred embodiments thereof, it will be understood by those skilled in the art that changes in form and details may be made therein without departing from the scope and spirit of the invention.

What is claimed is:

1. A communication system, comprising:
   at least one spacecraft in geosynchronous orbit, said spacecraft providing a plurality of beams on the surface of the earth; and
   a plurality of ground stations, individual ones of which are located in one of said beams for transmitting uplink signals to said spacecraft; wherein said spacecraft is comprised of a plurality of receivers for receiving a plurality of the uplink signals in separate channels in said beam from ground stations, a frequency translator for translating the received uplink signals to a transmission frequency of a plurality of downlink signals, a plurality of channel amplifiers, each channel amplifier adapted to amplify a respective transmitted uplink signal and each channel amplifier being gain controlled by a corresponding one of said ground stations, and a plurality of transmitters for transmitting the plurality of downlink signals within the same beams as the corresponding uplink signals; and wherein each said transmitter is comprised of a combiner for combining together a selected plurality of frequency translated channel amplified signals and a power amplifier for amplifying the combined plurality of frequency translated channel amplified signals, and further comprising an output splitter for separating the amplified combined plurality of frequency translated channel amplified signals into a plurality of downlink signals in a plurality of said beams.

2. A system as in claim 1, wherein said power amplifier is comprised of a linearly driven single TWTA or multiple paralleled TWTAs.

3. A system as in claim 2, wherein individual ones of the plurality of frequency translated signals are selected such that a sum of a maximum downlink RF power will not exceed the power handling capability and linearity of said single TWTA or multiple paralleled TWTAs.

4. A system as in claim 1, wherein said beams have different sizes and shapes, and are non-contiguous over at least a portion of the earth's surface.

5. A system as in claim 1, wherein uplink beams to at first one of said spacecraft have a first polarization and downlink beams have a second, opposite polarization, and wherein uplink beams to a second one of said spacecraft have said second polarization and downlink beams have said first polarization.

6. A system as in claim 1, wherein the uplink and downlink signals comprise digital data signals.

7. A system as in claim 1, wherein the uplink and downlink signals comprise digital television signals.

8. A system as in claim 7, wherein said beams are spot beams having non-uniform sizes and shapes, and wherein individual ones of said spot beams overlie a predetermined one of a designated television market area.

9. The system of claim 1 wherein each channel amplifier provides approximately 50 db of gain to each frequency translated uplink signal.

10. The system of claim 1 wherein each ground station has separate RF control of its respective uplink signal.

11. The system of claim 1 wherein multiple ground stations are located within a single spot beam.

12. A method of power sharing in a satellite communication system comprising the steps of:
receiving a plurality of uplink signals from individual ground stations located in a beam of a satellite,
separating the uplink signals in each beam into into a transponder channel;
channel amplifying each transponder channel dependent on a control signal received from a corresponding ground station;
combining a plurality of beams of the satellite, each beam including a plurality of selected uplink signals from fixed users in a designated local to local closed system spot beam area, each selected uplink signal being assigned to a predetermined transponder channel that does not interfere with another selected uplink signal, wherein the signals in each beam are processed as a group;
feeding the combined plurality of beams to a single power amplifier, wherein a sum of a maximum RF power for a plurality of corresponding downlink signals for the beams selected to be combined does not exceed a power handling capability of the power amplifier;
separating the combined feeds into the plurality of downlink signals, each downlink signal assigned to the predetermined channel of the corresponding uplink channel; and
transmitting the individual downlink signals in the plurality of beams.

13. A communication system using a geostationary earth orbit satellite comprising:
at least one spacecraft in geosynchronous orbit, said spacecraft providing a plurality of beams on the surface of the earth; and
a plurality of fixed ground stations, individual ones of which are located in one of said beams for transmitting uplink signals to said spacecraft, wherein the system comprises a local to local closed system, and each fixed ground station
is located within a designated closed system spot beam area; and wherein
said spacecraft is comprised of a plurality of receivers for receiving a plurality of the uplink signals in separate channels in said beam from ground stations, a frequency translator for translating the received uplink signals to a transmission frequency of a plurality of downlink signals, a plurality of channel amplifiers, each channel amplifier adapted to amplify a respective transmitted uplink signal and each channel amplifier being gain controlled by a corresponding one of said ground stations, and a plurality of transmitters for transmitting the plurality of downlink signals within the same beams as the corresponding uplink signals; and wherein
each said transmitter is comprised of a combiner for combining together a selected plurality of frequency translated channel amplified signals and a power amplifier for amplifying the combined plurality of frequency translated channel amplified signals, and further comprising an output splitter for separating the amplified combined plurality of frequency translated channel amplified signals into a plurality of downlink signals in a plurality of said beams.

14. A satellite communication system comprising:
at least one spacecraft providing a plurality of downlink beams on the surface of the earth;
a plurality of ground stations, multiple ground stations located in each of the beams, each ground station adapted to transmit and gain control an uplink signal transmitted from the ground station to the spacecraft, wherein each spacecraft comprises:
a plurality of receivers for receiving each uplink signal, each receiver adapted to receive each uplink signal on a separate channel of the receiver;
a frequency translator for translating each received uplink signal to a transmission frequency of a corresponding downlink signal;
a separate channel amplifier for each channel of the receiver, each channel amplifier being individually gain controlled by the ground station corresponding to the received uplink signal;

- a combiner for combining together a selected plurality of frequency translated, channel amplified uplink signals;
- a single power amplifier adapted to amplify the combined plurality of frequency translated, channel amplified uplink signals; and
- an output splitter for separating the amplified the combined plurality of frequency translated, channel amplified uplink signals into a plurality of downlink signals in the beams for transmission.

15. A method of satellite communication comprising the steps of:
- combining a plurality of lower power downlink beams in a transponder channel;
- summing the combined plurality of lower power downlink beams in a combiner;
- amplifying the summed, combined plurality of lower power downlink beams in a linearized high powered amplifier;
- separating out the power amplified beams into separate beams; and transmitting each separate beam with an associated downlink antenna.

16. The method of claim 15 further comprising the step, prior to the combining step, of adjusting a gain of a particular transponder channel using a corresponding channel amplifier prior to combining the transponder channel with other transponder channels, the gain being adjusted based on a control signal received from a corresponding ground station.

17. The method of claim 15 further comprising the step of monitoring a resulting downlink beam and compensating for any signal impairment by transmitting a signal amplification control signal from a corresponding ground station to a corresponding channel amplifier in the transponder channel.

18. The method of claim 15 further comprising the steps, prior to the step of summing of, determining the number of ground stations that can share a common TWTA and assigning a separate channel amplifier to each ground station.

19. The method of claim 15 further comprising the step of assigning a separate channel amplifier for each ground station, wherein multiple ground stations share a TWTA.

20. The method of claim 15 wherein the step of summing further comprises the step of using input multiplexers to sum signals arriving from the beams, wherein a use of a same transponder channel in a same input multiplexer is avoided and a summed output is transmitted to a single receiver.

* * * * *